US011761655B2

(12) United States Patent
Craft et al.

(10) Patent No.: US 11,761,655 B2
(45) Date of Patent: Sep. 19, 2023

(54) ZONE CONTROLLER AND METHOD FOR IDENTIFYING A ROOT CAUSE FAILURE

(71) Applicant: Siemens Industry, Inc., Alpharetta, GA (US)

(72) Inventors: Jesse Craft, Oakland, CA (US); Melvin Hidayat, Livermore, CA (US); David Latour, Castro Valley, CA (US)

(73) Assignee: Siemens Industry, Inc., Alpharetta, GA (US)

( * ) Notice: Subject to any disclaimer, the term of this patent is extended or adjusted under 35 U.S.C. 154(b) by 96 days.

(21) Appl. No.: 16/684,133

(22) Filed: Nov. 14, 2019

(65) Prior Publication Data
US 2021/0148591 A1 May 20, 2021

(51) Int. Cl.
| *F24F 11/38* | (2018.01) |
| *F24F 11/49* | (2018.01) |
| *F24F 11/58* | (2018.01) |
| *F24F 11/64* | (2018.01) |
| *G05B 19/042* | (2006.01) |
| *G05B 23/02* | (2006.01) |
| *F24F 140/40* | (2018.01) |

(Continued)

(52) U.S. Cl.
CPC .............. *F24F 11/38* (2018.01); *F24F 11/49* (2018.01); *F24F 11/58* (2018.01); *F24F 11/64* (2018.01); *G05B 19/042* (2013.01); *G05B 23/0259* (2013.01); *F24F 2110/10* (2018.01); *F24F 2110/30* (2018.01); *F24F 2140/40* (2018.01); *G05B 2219/2614* (2013.01)

(58) Field of Classification Search
CPC .. F24F 11/38; F24F 11/64; F24F 11/49; F24F 11/58; F24F 2140/40; F24F 2110/30; F24F 2110/10; G05B 19/042; G05B 23/0259; G05B 2219/2614; G05B 23/0278; G05B 23/0286; G05B 15/02
See application file for complete search history.

(56) References Cited

U.S. PATENT DOCUMENTS

| 4,653,280 A * | 3/1987 | Hansen .................... G05B 9/02 62/127 |
| 10,386,800 B2 | 8/2019 | Ahmed et al. |

(Continued)

OTHER PUBLICATIONS

PCT Search Report dated Mar. 24, 2021, for PCT Application No. PCT/US2020/054706, 23 pages.

*Primary Examiner* — Christopher E. Everett
*Assistant Examiner* — Tameem D Siddiquee

(57) ABSTRACT

There is described a zone controller and method for identifying a root cause failure at a zone. The zone controller determines whether a temperature measurement deviates from a temperature setpoint of the temperature sensor, and generates a first repair code, a second repair code, and/or a third repair code. The first repair code replaces a temperature sensor in response to detecting that a reading of the temperature sensor has failed. The second repair code releases an operator override on the reading of the temperature sensor in response to detecting that the reading of the temperature sensor has been overridden. The third repair code releases an operator override on a setpoint of the temperature sensor in response to detecting that the setpoint of the temperature sensor is outside the predetermined setpoint range. One or more of these repair codes are provided to a remote device.

18 Claims, 7 Drawing Sheets

(51) Int. Cl.
*F24F 110/30* (2018.01)
*F24F 110/10* (2018.01)

(56) References Cited

U.S. PATENT DOCUMENTS

| | | | | |
|---|---|---|---|---|
| 2005/0077368 | A1* | 4/2005 | Zak | H01L 35/00 |
| | | | | 237/19 |
| 2011/0137853 | A1* | 6/2011 | Mackay | G05B 23/0248 |
| | | | | 706/57 |
| 2011/0178977 | A1* | 7/2011 | Drees | G06Q 10/04 |
| | | | | 706/52 |
| 2013/0197698 | A1* | 8/2013 | Shah | F24F 11/30 |
| | | | | 700/276 |
| 2014/0303789 | A1* | 10/2014 | Wroblewski | F24F 11/30 |
| | | | | 700/276 |
| 2015/0107817 | A1* | 4/2015 | Douglas | F24F 11/30 |
| | | | | 165/248 |
| 2017/0192400 | A1* | 7/2017 | Hofschulz | H04W 4/70 |
| 2018/0199534 | A1 | 7/2018 | Weiss et al. | |
| 2018/0299839 | A1 | 10/2018 | Salsbury et al. | |
| 2019/0353388 | A1* | 11/2019 | Burns | F24F 3/0527 |
| 2020/0158369 | A1* | 5/2020 | Gervais | F24F 11/76 |
| 2020/0285226 | A1* | 9/2020 | Chatterjee | G05B 23/0297 |
| 2020/0309852 | A1* | 10/2020 | Lu | G05B 23/0286 |

\* cited by examiner

FIG. 7

| Repair Description | Units | Part Count | Estimated Labor Hrs. |
|---|---|---|---|
| Install discharge air temperature sensor | 315 | 315 | 315 |
| Replace failed TEC | 1 | 1 | 2 |
| Correct configuration issue | 68 | 0 | 34 |
| Replace airflow sensor | 2 | 2 | 2 |
| Release operator override | 16 | 0 | 8 |
| Repair airflow sensor | 20 | 0 | 20 |
| Repair damper actuator | 13 | 0 | 13 |
| Replace valve actuator | 1 | 1 | 2 |
| Field investigation | 75 | 0 | 150 |

ZONE CONTROLLER AND METHOD FOR IDENTIFYING A ROOT CAUSE FAILURE

FIELD OF THE INVENTION

This application relates to the field of building management systems and, more particularly, to a zone controller of a building management system capable of fault detection and diagnostics.

BACKGROUND

Building management systems encompass a variety of systems that aid in the monitoring and control of various aspects of building operation. Examples of building management systems include security systems, fire safety systems, lighting systems, and heating, ventilation, and air conditioning ("HVAC") systems. For effective operation, these building management systems include controllers that are widely dispersed throughout a facility.

A controller of a building management system uses multiple sensor readings and control devices to maintain conditions of rooms or other spaces of a facility, such as monitoring and controlling room temperatures at setpoint values. Multiple points of failure are possible because multiple devices and sensors involved. Existing building management systems require manual evaluation by a technician or engineer, which is labor intensive and prone to error based on the specific experience level of the individual conducting the analysis.

Many controllers of building management systems utilize Fault Detection and Diagnostics (FDD) rules to determine when components of control sequences are not working properly. These FDD rules can identify whether a reading deviates from a setpoint but are not adept at identify the root cause of failure. For example, the FDD rules often generate multiple faults for a single device. As another example, multiple different root causes might trigger the same FDD rule. It is important to determine the correct root cause of a failure in order to take the proper corrective action to correct the fault or faults.

SUMMARY

In accordance with one embodiment of the disclosure, there is provided an approach for identifying a root cause of a failure for a building or other facility, beyond mere fault detection and diagnostics. The zone controller and method described herein provide improved accuracy and execution speed, as well as a reduction in manual labor and cost required to identify the root cause. The reduction in cost includes minimizing potential time and expense to replace erroneous sensors or devices that do not address the fault. Thus, the zone controller and method conduct root cause analysis in real-time, reducing the time from fault generation to provide repairs and/or recommendations. The controller and method also provide the ability to quickly incorporate multiple faults and sources of data without missing steps or jumping to improper conclusions.

One aspect is a zone controller for identifying a root cause failure at a zone. The zone controller comprises a zone temperature sensor of the zone, an input component, a processor, and a communication component. The input component is coupled to the zone temperature sensor and configured to detect a zone temperature measurement at the zone temperature sensor. The processor component is coupled to the input component and configured to perform one or more of various operations in response to determining that the zone temperature measurement deviates from a zone temperature setpoint of the zone temperature sensor. For one operation, the processor generates a first temperature repair code to replace a zone temperature sensor in response to detecting that a reading of the zone temperature sensor has failed. For another operation, the processor generates a second temperature repair code to release an operator override on the reading of the zone temperature sensor in response to detecting that the reading of the zone temperature sensor has been overridden. For yet another operation, the processor generates a third temperature repair code to release an operator override on a setpoint of the zone temperature sensor in response to detecting that the setpoint of the zone temperature sensor is outside a predetermined setpoint range. The communication component is coupled to the processor and configured to provide, via a network connection, one or more repair codes to a remote device, in which the multiple repair codes include the first, second, and third temperature repair codes.

Another aspect is a method of a zone controller for identifying a root cause failure at a zone. The zone controller detects a zone temperature measurement at a zone temperature sensor of the zone and determines whether the zone temperature measurement deviates from a zone temperature setpoint of the zone temperature sensor. The zone controller performs one or more of various operations in response to determining that the zone temperature measurement deviates from a zone temperature setpoint of the zone temperature sensor. For one operation, the zone controller generates a first temperature repair code to replace a zone temperature sensor in response to detecting that a reading of the zone temperature sensor has failed. For another operation, the zone controller generates a second temperature repair code to release an operator override on the reading of the zone temperature sensor in response to detecting that the reading of the zone temperature sensor has been overridden. For yet another operation, the zone controller generates a third temperature repair code to release an operator override on the zone temperature setpoint of the zone temperature sensor in response to detecting that the zone temperature setpoint of the zone temperature sensor is outside a predetermined setpoint range. The zone controller provides, via a network connection, one or more repair codes to a remote device, in which the multiple repair codes includes the first, second, and third temperature repair codes.

Yet another aspect is a zone controller for identifying a root cause failure at a zone. The controller comprises an airflow velocity sensor of a terminal box associated with the zone, an input component, a processor, and a communication component. The input component is coupled to the airflow velocity sensor and configured to detect an airflow measurement at the airflow velocity sensor. The processor component is coupled to the input component and configured to perform one or more of various operations in response to determining that the airflow measurement detected by the input component deviates from an airflow setpoint of the airflow velocity sensor. For one operation, the zone controller generates a first airflow repair code to replace the airflow velocity sensor in response to detecting that a reading of the airflow velocity sensor has failed. For another operation, the zone controller generates a second airflow repair code to release an operator override on the reading of the airflow velocity sensor in response to detecting that the reading of the airflow velocity sensor has been overridden. For yet another operation, the zone controller generates a third airflow repair code to release an operator override on a command for a damper of the terminal box in response to detecting that the command of the damper has been overridden. For still another operation, the zone controller generates a fourth airflow repair code to repair or replace the airflow velocity sensor in response to detecting that the reading of the airflow velocity sensor is a null value. For yet still another operation, the zone controller generates a fifth airflow repair code to release an operator override on the airflow setpoint in response to detecting that the airflow setpoint has been overridden. For a further operation, the zone controller generates a sixth airflow code to repair or replace the airflow velocity sensor in response to detecting that the reading of the airflow velocity sensor is greater than a predetermined airflow setpoint threshold. The communication component is coupled to the processor, and configured to provide, via a network connection, one or more repair codes of multiple repair codes to a remote device, in which the multiple repair codes include the first, second, third, fourth, fifth, and sixth airflow repair codes.

Still another aspect is a method of a zone controller for identifying a root cause failure at a zone. The zone controller detects an airflow measurement at an airflow velocity sensor of the zone and determines whether the airflow measurement deviates from an airflow velocity setpoint of the airflow sensor. The zone controller performs one or more of various operations in response to determining that the airflow measurement deviates from an airflow setpoint of the airflow velocity sensor. For one operation, the zone controller generates a first airflow repair code to replace the airflow velocity sensor in response to detecting that a reading of the airflow velocity sensor has failed. For another operation, the zone controller generates a second airflow repair code to release an operator override on the reading of the airflow velocity sensor in response to detecting that the reading of the airflow velocity sensor has been overridden. For yet another operation, the zone controller generates a third airflow repair code to release an operator override on a command for a damper of the terminal box in response to detecting that the command of the damper has been overridden. For still another operation, the zone controller generates a fourth airflow repair code to repair or replace the airflow velocity sensor in response to detecting that the reading of the airflow velocity sensor is a null value. For yet still another operation, the zone controller generates a fifth airflow repair code to release an operator override on the airflow setpoint in response to detecting that the airflow setpoint has been overridden. For a further operation, the zone controller generates a sixth airflow repair code to repair or replace the airflow velocity sensor in response to detecting that the reading of the airflow velocity sensor is greater than a predetermined airflow setpoint threshold. The zone controller provides, via a network connection, one or more repair codes of multiple repair codes to a remote device, in which the multiple repair codes include the first, second, third, fourth, fifth, and sixth airflow repair codes.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 7 depicts an example commissioning or service report representing repair and/or replacement actions resulting from the analysis of FIG. 4.

DETAILED DESCRIPTION

Figure 1:
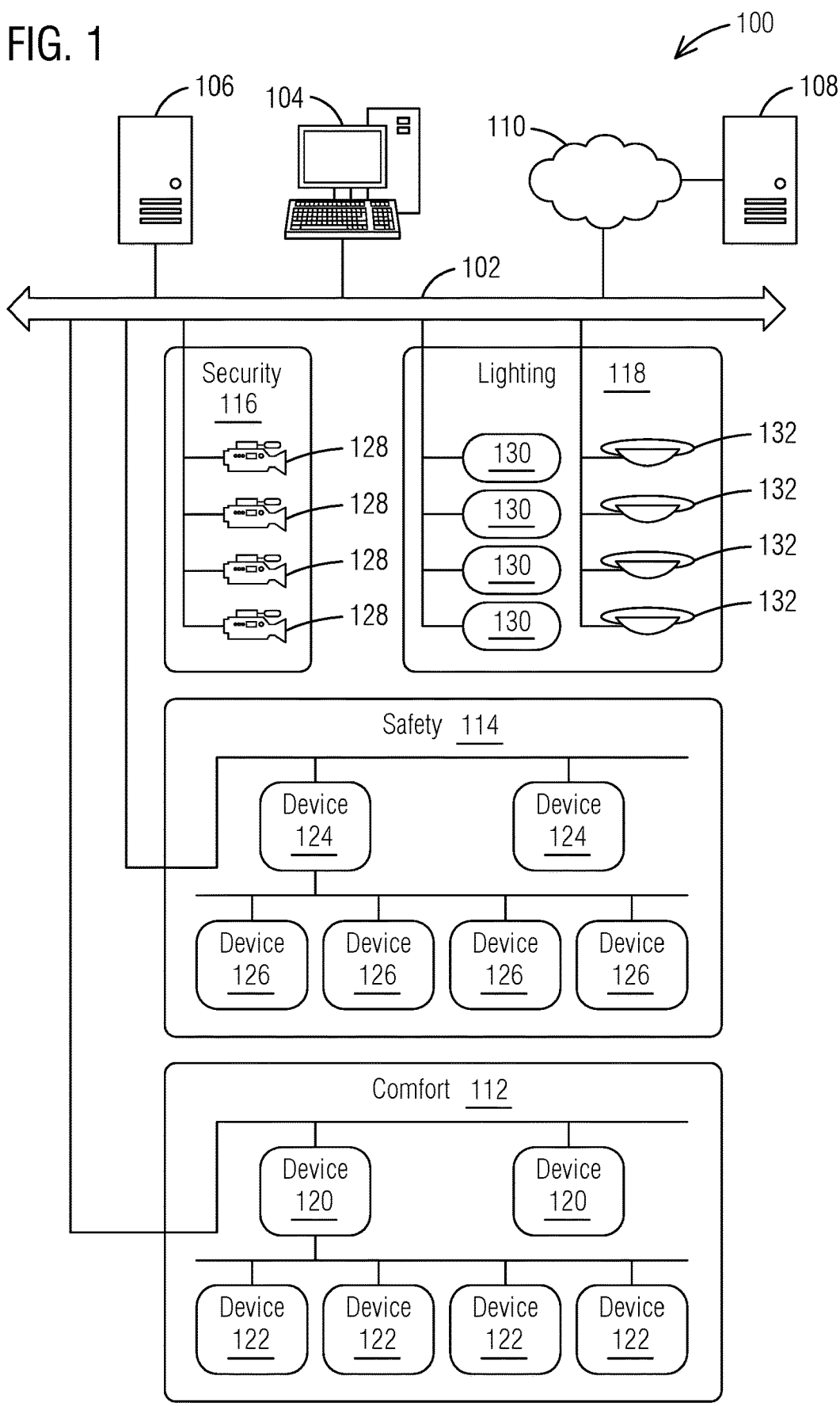
FIG. 1 is an illustration of a building management system in an example implementation that is operable to employ techniques described herein.

Various technologies that pertain to systems and methods to identify a root cause of a failure for building or other facility will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The zone controller and method described herein includes a hierarchical structure for identifying and addressing a root cause of a fault that incorporates point metadata of a facility and multiple fault analysis rules into a single diagnostic process. The zone controller maintains airflow setpoint as well as space temperature. Fault detection may identify whether one of these readings deviates from setpoint but not identify root cause of the failure. For example, the system and method may identify eight faults with eighteen different possible root causes associate with each reading but there is no one-to-one relationship. The same device may generate multiple faults that are interdependent. If a device is not controlling its airflow setpoint correctly, then that may also cause a temperature deviation. In contrast to existing devices, the zone controller determines the proper root cause in order to take the proper corrective action and return the building management system to proper operation.

One or more controllers of the building management system, such as the zone controller, determine the root cause of a fault automatically by performing functions beyond simple fault detection. For example, the controller(s) may determine and analyze the relationships between different faults, such as a flow control fault causing a temperature fault, in response to detecting a temperature deviation from setpoint by an allowable threshold. The controller(s) also incorporate other information into the diagnostic process including point metadata, for example, status "alarm" or "failure" as well as priority data. The controller(s) may further incorporate device configuration data, i.e., configuration values associated with each zone controller, in which constant or continuous default values (such as zero) may indicate a problem.

Referring to FIG. 1, there is shown a building management system 100 in an example implementation that is operable to employ techniques described herein. The building management system 100 includes an environmental control system configured to control one or more environmental parameters for a facility, such as temperature, humidity, ventilation, lighting, fire safety, security, and the like. For example, the building management system 100 may comprise one or more network connections or buses 102 for connectivity to components of the system. For one embodiment, the example building management system 100 may comprise one or more management devices, such as a management workstation 104, a management server 106, or a remote management device 108 connecting through a wired or wireless network 110, that allows the setting and/or changing of various controls of the system. While a brief description of the building management system 100 is provided below, it will be understood that the building management system 100 described herein is only one example of a particular form or configuration for a building management system. The system 100 may be implemented in any other suitable manner without departing from the scope of this disclosure.

The management devices 104, 106, 108, are configured to provide overall control and monitoring of the building management system 100. For the illustrated embodiment of FIG. 1, the building management system 100 provides connectivity to subsystems for various environmental parameters such as components of comfort systems 112, safety systems 114, security systems 116, and lighting systems 118. For example, comfort systems 112 may include various devices 120, 122 for monitoring and controlling heating, cooling, and ventilation of areas within a building or group of buildings. Examples of comfort devices include, but are not limited to, stations, field panels, field controllers, field devices, and the like. Some devices 120 may communicate directly with a network connection or bus 102, whereas other devices 122 may communicate through, and perhaps be controlled by, another device. Similarly, safety systems 114 may include various devices 124, 126 for monitoring and controlling fire protection for areas within a building or a group of buildings. Examples of safety devices include, but are not limited to controllers, control panels, detectors, alarm systems, video surveillance cameras, and the like. Similar to comfort devices, some safety devices 124 may communicate directly with a network connection or bus 102, whereas other safety devices 126 may communicate through, and perhaps be controlled by, another device. As stated above, the illustrated embodiment of the building management system 100 may provide southbound connectivity to subsystems 128 for security systems 116 and other systems, such as video surveillance cameras and motion detectors, for monitoring and controlling various areas within a building or a group of buildings.

The lighting systems 118 may include various devices 130, 132 for monitoring and controlling illumination of areas within a building or group of buildings. Examples of lighting devices include, but are not limited to, lighting sensors such as occupancy sensors, lighting controllers such as UV light controllers, lighting switches, lighting gateways, lighting hubs, lighting servers, and the like. Occupancy sensors include, but are not limited to, light sensors, motion sensors, temperatures sensors, image sensors (such as still and video images), and air quality sensors. Lighting controllers may be connected to, or integrated with, light fixtures of a particular area. Similar to the comfort, safety, and security devices, lighting devices may communicate directly with a network connection or bus 102, and/or through, and perhaps be controlled by, another device. The lighting system 118 may include legacy or 3rd party devices to be coupled to other devices of the building management system 100. It is to be understood that the system 100 may comprise any suitable number of any of components based on the particular configuration for each building or group of buildings.

Figure 2:
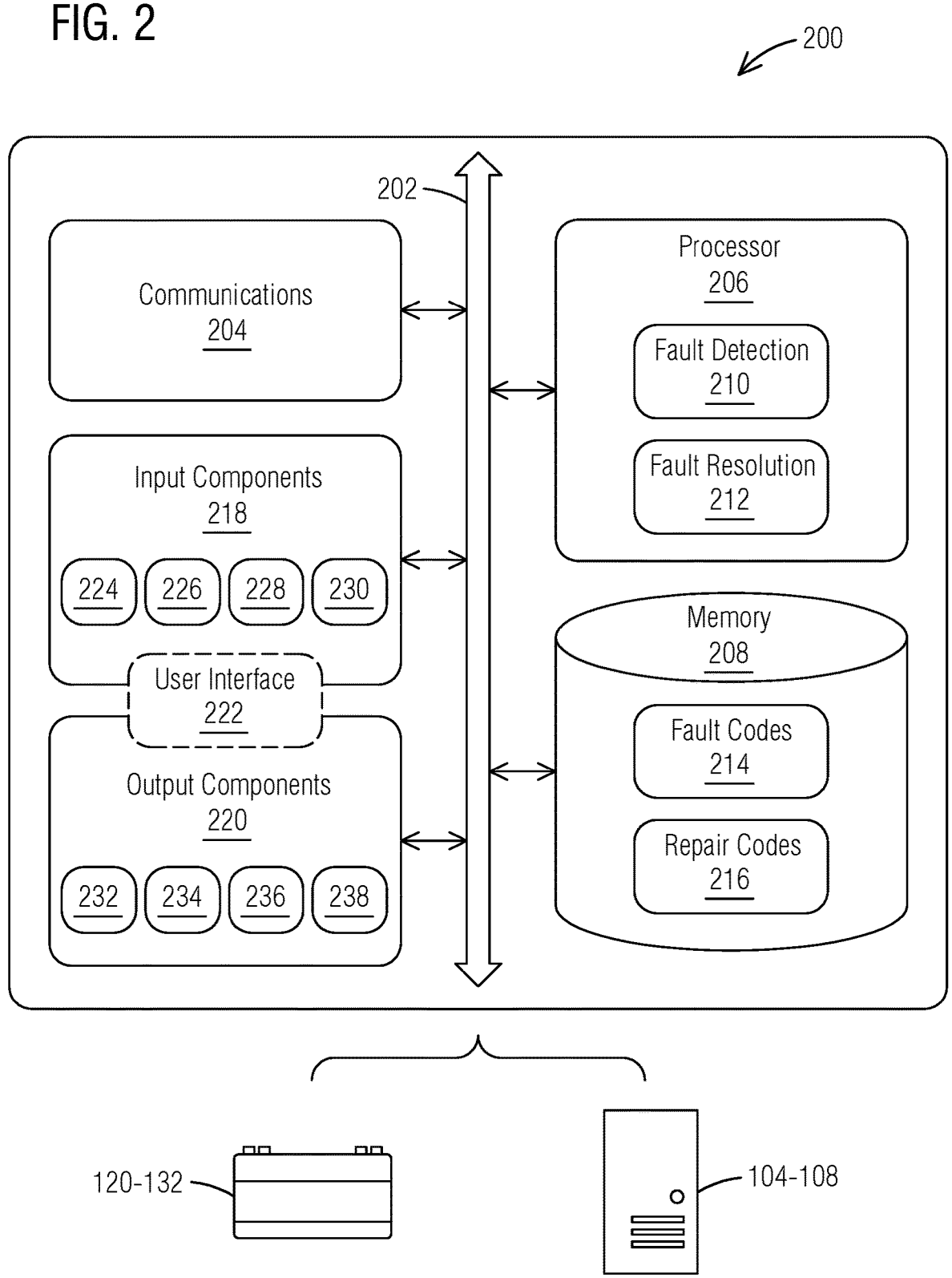
FIG. 2 is a block diagram representing a zone controller in an example implementation that is operable to employ the techniques described herein.

FIG. 2 represents example device components 200 of a zone controller that may operate in the building management system 100, employing the techniques described herein. One or more devices of the building management system 100 may operate as the zone controller 200 including, but not limited to, the management workstation 104, management server 106, remote management device 108, comfort devices 120, 122, safety devices 124, 126, security devices 128, and lighting devices 130, 132. The device components 200 comprise a communication bus 202 for interconnecting components directly or indirectly. The device components further comprise one or more communication components 204 communicating other entities of the alarm system via a wired or wireless link, one or more processors 206, and one or more memory components 208. The communication component 204 of the device components 200 may also utilize wireless technology for communication, such as, but are not limited to, Bluetooth (including BLE), Wi-Fi (including Wi-Fi Direct), Zigbee, Z-Wave, 6LoWPAN, Near-Field Communication, other types of electromagnetic radiation of a radio frequency wave, light-based communications (including infrared), acoustic communications, and any other type of peer-to-peer technology. The communication component 204 may also, or in the alternative, utilize wired technology for communication, such as transmission of data over a physical conduit, e.g., an electrical wire, electrical cable, or optical fiber.

The processor 206 may execute code and process data received other components of the device components 200, such as information received at the communication component 204 or stored at the memory component 208. The code associated with the zone controller and stored by the memory component 208 may include, but is not limited to, operating systems, applications, modules, drivers, and the like. An operating system includes executable code that controls basic functions of the zone controller, such as interactions among the various components of the device components 200, communication with external devices via the communication component 204, and storage and retrieval of code and data to and from the memory component 208. Each application includes executable code to provide specific functionality for the processor 206 and/or remaining components of the zone controller. Examples of applications executable by the processor 206 include, but are not limited to, a fault detection module 210 to perform operations to detect indications of faults within the zone and a fault resolution module 212 (which may be integral to or separate from the fault detection application) to perform operations to resolve the detected faults. Data is information that may be referenced and/or manipulated by an operating system or application for performing functions of the zone controller and components associated with the zone. Examples of data associated with the zone controller and the associated zone, stored by the memory component 208, may include, but are not limited to, fault codes 214 identify potential faults (such as flow and/or temperature issues), and repair codes 216 (which may be integral to or separate from the fault codes) to identify one or more actions to address the identified faults.

The device components 200 of the zone controller may include one or more input components 218 and/or one or more output components 220. The input components 218 and the output components 220 of the device components 200 may include one or more visual, audio, mechanical, and/or other components. For some embodiments, the input components 218 and the output components 220 of the zone controller may comprise a user interface 222 for interaction with a user of the zone controller. Examples of particular interfaces of the input components 218 include, but are not limited to, an airflow sensor interface 224, valve sensor interface 226, temperature sensor interface 228, setpoint interface 230, and other types of interfaces for fault sensors or devices. Examples of particular interfaces of the output components 220 include, but are not limited to, a damper interface 232, valve interface 234, operator override interface 236, resolution reporting interface 238, and other types of zone devices.

It is to be understood that FIG. 2 is provided for illustrative purposes only to represent examples of the device components 200 of the zone controller and is not intended to be a complete diagram of the various components that may be utilized by the appliance. Therefore, the device may include various other components not shown in FIG. 2, may include a combination of two or more components, or a division of a particular component into two or more separate components, and still be within the scope of the present invention.

Figure 3:
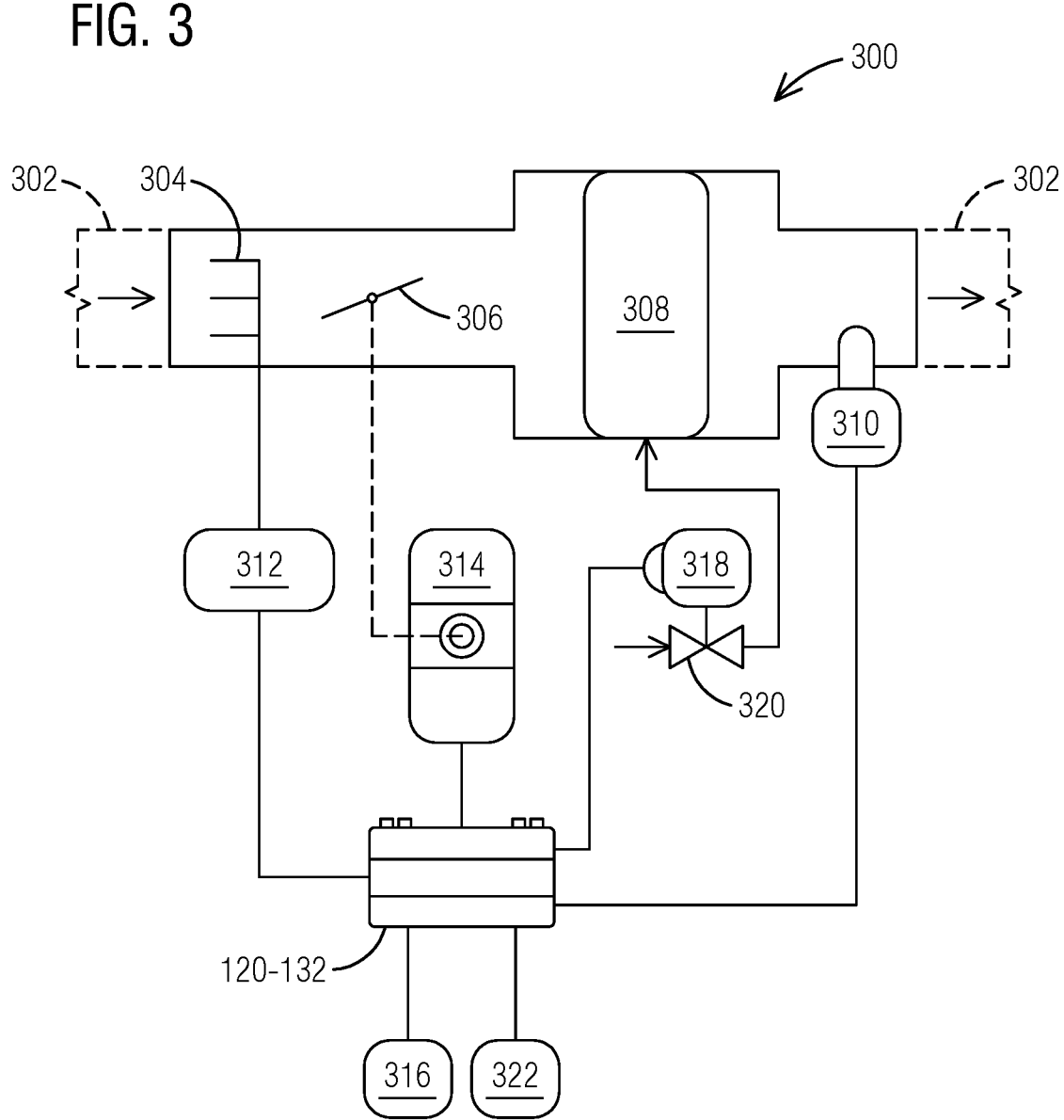
FIG. 3 is a block diagram depicting an example terminal box, associated with a zone, which includes the zone controller of FIG. 2.

Referring to FIG. 3, there is shown an example terminal box 300, associated with a zone, which includes the zone controller 120-132. The terminal box 300 may be connected to a heating, ventilation, and air conditioning (HVAC) system 302, and the terminal box includes an air velocity sensor 304 and a supply air damper 306. The terminal box 300 may also include a reheating subsystem 308 and/or a duct temperature sensor 310 at a discharge area of the terminal box. The terminal box 300 may be used for various Variable Air Volume applications, constant volume applications, fan coil applications (i.e., no connection to an air handler), and lab control applications (where airflow is controlling pressurization and air changes and not necessarily temperature). Applications of the terminal box 300 (as well as the zone controller 120-132) include, but are not limited to cooling applications, heating applications, cooling and heating applications, series fan powered applications, parallel fan powered applications, applications with electric reheat or baseboard radiation, and applications with hot water reheat.

The zone controller 120-132 provides direct digital control for many applications of the terminal box 300 and associated zone. The zone controller may operate as an independent, stand-alone zone controller or may be networked with one or more other devices, such as a field panel of the building management system. Connections for the zone controller 120-132 includes, but are not limited to interfaces to power wiring, communication wiring, visual indicators, air velocity sensors, temperature sensors (such as zone temperature sensors and duct temperature sensors), and actuators.

The zone controller 120-132 may couple to the air velocity sensor 304 directly or via a module 312 for providing periodic recalibration, and the zone controller may control the supply air damper 306 via a modulated damper actuator 314. The zone controller 120-132 is also coupled to, and controls, a zone temperature sensor 316 associated with the zone for detecting a current temperature of the zone. Further, for a terminal box 300 that includes a reheating subsystem, the zone controller 120-132 may include modules or valves for managing the reheating subsystem. For example, the zone controller 120-132 may be coupled to a controller 318 of one or more reheat valves 320 to control the flow of heated liquid traversing through reheating coils of a reheat component 308 of the terminal box 300. As another example, the zone controller 120-132 may be coupled to the reheat component 308 and control electrical reheat of the terminal box and/or baseboard radiation of the zone. The zone controller may be further couple to one or more manual switches or control panels 322 located at the zone.

Figure 4:
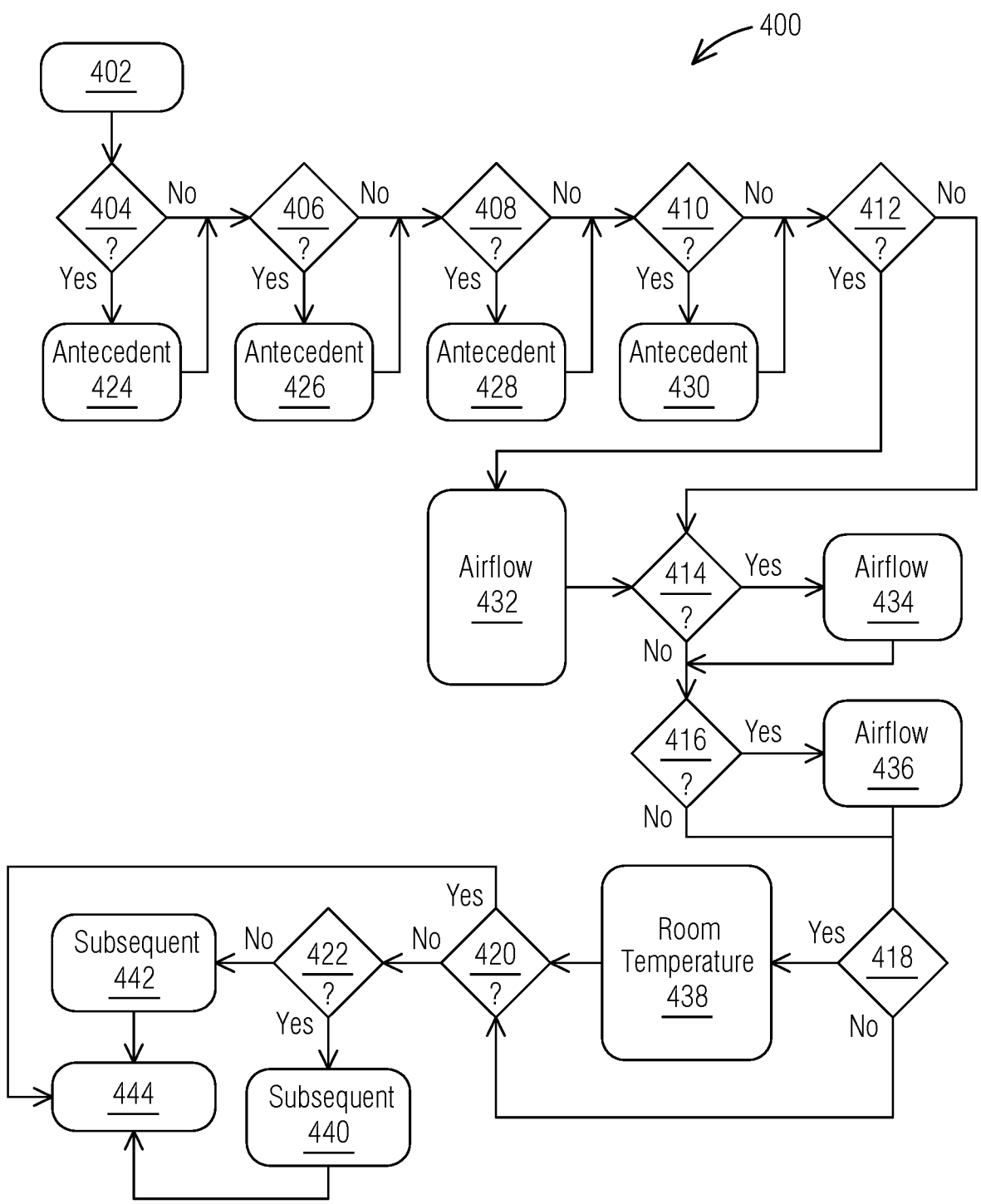
FIG. 4 is a flow diagram depicting an example root cause analysis of the zone controller of FIG. 2.

Referring to FIG. 4, there is shown an example root cause analysis 400 of the zone controller 120-132. FIG. 4 represents an approach for identifying the root cause failure of a malfunctioning temperature control process for a zone (e.g., a space, room, or duct) associated with the particular room controller 120-132. The approach enables the zone controller 120-132 to correctly identify the root cause failure while minimizing any requirement for a trial and error replacement test by following a sequence of operations and analyzing identified data points or codes. In addition to data used to apply initial rules for identification of the various fault codes, the approach also analyzes the point metadata of "status" and "priority", such as when checking whether a value is identified as "failed" or "overridden". Note that the approach depicts one specific implementation of the algorithm, but certain modifications could be made without materially affecting the outcome.

As stated above, the root cause analysis 400 for identifying the root cause follows a sequence of operations and analyzes identified data points or codes. The root cause analysis 400 begins 402, and detects 404-422 one or more fault conditions and, in response, determines 424-442 one or more repair actions. In particular, the antecedent conditions of the terminal box may be reviewed and, if an antecedent fault of the terminal box 300 is detected, then the root cause analysis 400 determines an antecedent action for the terminal box in response to detecting the antecedent fault.

For the antecedent conditions, determining the antecedent action may include generating 424 a first antecedent repair code to install a duct temperature sensor 310 at a discharge area of the terminal box 300 in response to detecting 404 a first antecedent fault code of the terminal box. The first antecedent fault code indicates that the zone controller 120-132 includes a reheat subsystem 308, such as a hot water reheat, but does not include the duct temperature sensor 310. Installation of the duct temperature sensor 310 is not required for proper function of the diagnostic process but does provide additional value to the root cause analysis 400, particularly for a zone controller with a reheat subsystem 308. In particular, the duct temperature sensor 310 at the discharge area would facilitate detection of any issues with the reheat subsystem 308. Thus, for this particular embodiment, the duct temperature sensor 322 would be installed at the discharge area of the terminal box 300 by a technician or other authorized person.

Also, for the antecedent conditions, determining the antecedent action includes generating 426 a second antecedent repair code to replace the zone controller 120-132 in response to detecting 406 a second antecedent fault code of the terminal box 300. The second antecedent fault code indicates a failure at the zone controller 120-132, such as a lack of an outgoing response to an incoming signal. For this embodiment, a failure at the zone controller 120-132 results in replacement of the zone controller by a technician or other authorized person.

Further for the antecedent conditions, determining the antecedent action includes generating 428 a third antecedent repair code to correct minimum and maximum airflow setpoints in response to detecting 408 a third antecedent fault code. The third antecedent fault code indicates that the minimum and maximum airflow setpoints are set to the default values. In particular, when the zone controller 120-132 is manufactured or offered for sale, the minimum and maximum airflow setpoints are set to default values. When the zone controller is installed on site, these values are configured to site-specific values based on the intended design of the zone. Thus, default values for the minimum and maximum airflow setpoints indicate that this configuration has been lost or was not properly configured on installation. For this embodiment, default values for the minimum and maximum airflow setpoints results in correcting those setpoints of the zone controller 120-132. The setpoints may be corrected automatically by the zone controller 120-132, a remote device 104-108, and/or manually by a technician or other authorized person in response to detecting the issue.

Yet further for the antecedent conditions, determining the antecedent action or actions may include generating 430 a fourth antecedent repair code to correct minimum airflow setpoints in response to detecting 410 a fourth antecedent fault code. The fourth antecedent fault code indicates that the heating and cooling minimum airflow setpoints mismatch. Generally, the heating minimum airflow setpoint and the cooling minimum airflow setpoint should be similar, so a mismatch of these setpoints indicates a problem. For this embodiment, a mismatch of the heating and cooling minimum airflow setpoints results in correcting the mismatch of these setpoints of the zone controller 120-132. The setpoints may be corrected automatically by the zone controller 120-132, a remote device 104-108, and/or manually by a technician or other authorized person.

It should be noted that determining the antecedent action or actions may include generating 424-430 a combination of the above repair codes in response to detecting 404-410 a combination of the above fault codes at the zone controller 120-132. One or more of a set of repair code(s) may be provided to a remote device, such as the management workstation 104, the management server 106, or the remote management device 108, and the set of repair codes may include the first, second, third, and/or fourth repair codes (and possibly other repair codes).

The root cause analysis 400 may include detecting an airflow measurement at an airflow velocity sensor 304 of the terminal box 300 associated with the zone and determining whether the airflow measurement deviates from an airflow setpoint of the airflow velocity sensor. The root cause analysis 400 reviews the associated point metadata, such as "status" and "priority", and identifies or determines 432 one or more airflow repair codes if the root cause analysis detects 412 a first airflow fault code indicating that the airflow measurement deviates from the airflow setpoint. Examples of associated airflow repair codes are described further below in reference to FIG. 5, such as first through sixth airflow repair codes.

The root cause analysis 400 may generate 434 a seventh airflow repair code to repair or replace an unresponsive or "leaking by" damper actuator 314 in response to detecting 414 a second airflow fault code. The damper may be unresponsive or "leaking by" causing unwanted airflow. The second airflow fault code identifies the airflow measurement at the airflow velocity sensor 304, of the terminal box 300 associated with the zone, with the supply air damper 306 commanded closed.

The root cause analysis 400 may include generating 436 an eighth airflow repair code to repair or replace an unresponsive or "leaking by" hydronic control valve 320 in response to detecting 416 a third airflow fault code. The hydronic control valve 320 may be unresponsive or "leaking by" causing unwanted increases or decreases in temperature. It should be noted that, although we refer to it as the third airflow fault code, airflow deviation does not trigger this particular fault. The third airflow fault code identifies that a fault of the heating or cooling device has been detected, such as the reheating subsystem 308 of the terminal box 300 associated with the zone. Detection of the fault of the heating or cooling device may include, but are not limited to, one or more of the following five valve faults. A first valve fault may be indicated by heating and cooling valves both modulating at the same time. A second valve fault may be indicated by a temperature rise across a heating coil with the valve closed. A third valve fault may be indicated by no temperature rise across a heating coil with the valve open. A fourth valve fault may be indicated by a temperature drop across the cooling coil with the valve closed. A fifth valve fault may be indicated by no temperature drop across the cooling coil with the valve open.

The root cause analysis 400 may include detecting a zone temperature measurement at a zone temperature sensor 316 of the zone and determining whether the zone temperature measurement deviates from a zone temperature setpoint of the zone temperature sensor. The root cause analysis 400 reviews the point metadata of terminal box and zone, such as "status" and "priority", and identifies a temperature fault code if the root cause analysis determines that the zone temperature measurement deviates from the zone temperature setpoint. In particular, the root cause analysis 400 identifies one or more repair codes 438 in response to detecting 418 deviation of the zone temperature measurement from the zone temperature setpoint. Examples of associated temperature repair codes are described further below in reference to FIG. 6, such as first through fourth temperature repair codes.

The root cause analysis 400 may review the subsequent conditions of the terminal box 300 and, if a subsequent fault of the terminal box is detected, then the root cause analysis 400 determines a subsequent action for the terminal box in response to detecting the subsequent fault.

The root cause analysis 400 may detect 420 whether the first airflow fault code or the temperature fault code remain unresolved. If the first airflow fault code and the temperature fault code are resolved, then the analysis 400 terminates 444. If the first airflow fault code or the temperature fault code remain unresolved, then the analysis 400 determines 422 whether the damper is 100% open. If the damper is 100% open, then the analysis 400 identifies 440 the first subsequent repair code which confirms whether the actuator responds, the air handler is providing sufficient pressure, and terminates 444. If the damper is not 100% open, then the analysis 400 identifies 442 the second subsequent repair code which determines that the matter is unresolved, indicates a requirement for a field investigation, and terminates 444. The root cause analysis 400 provides, via a network connection, one or more repair codes of the set of repair codes to a remote device, and the set of repair codes includes any and all repair codes implemented for the root cause analysis, such as the first repair code 424 through the eighteenth repair code 442.

Figure 5:
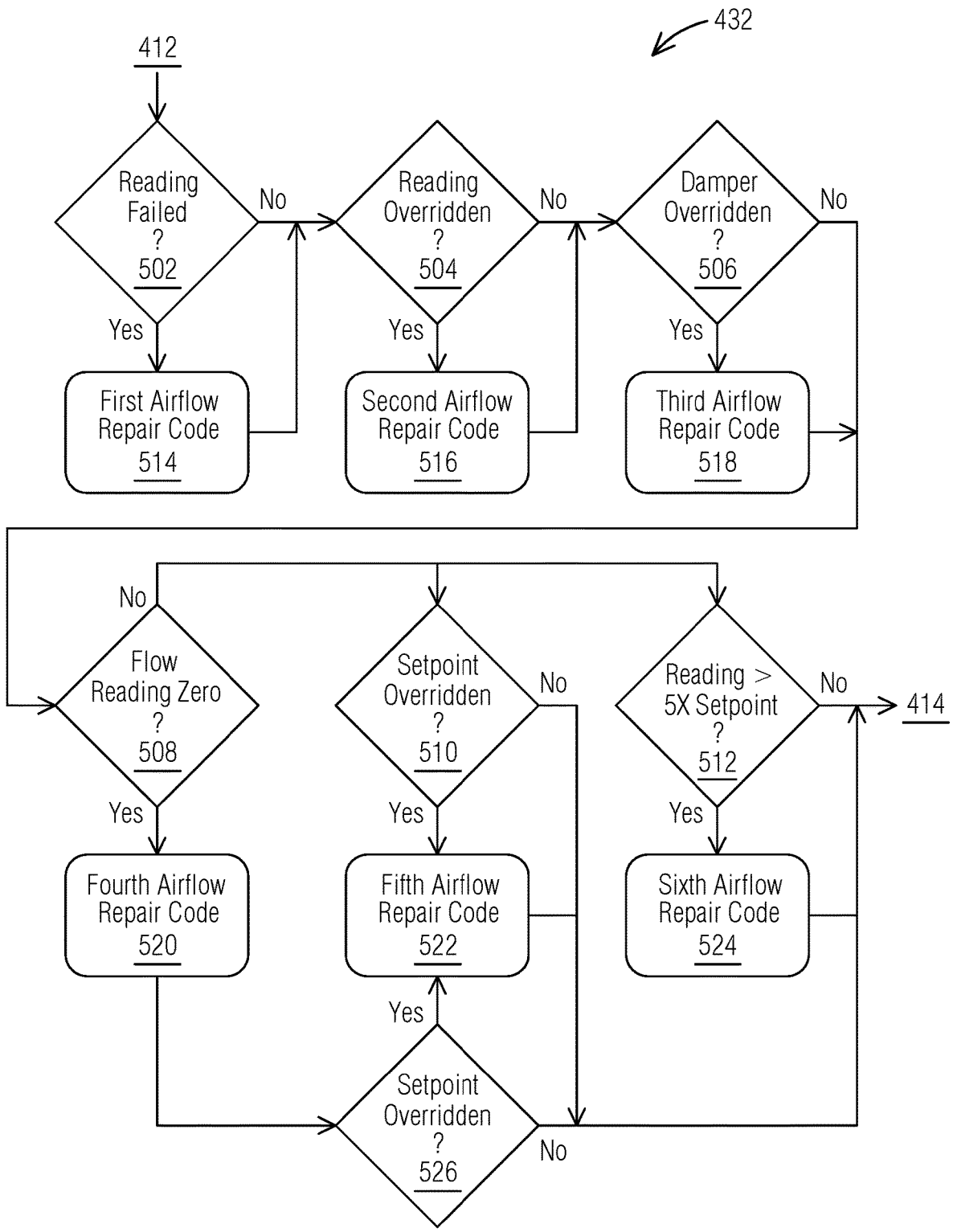
FIG. 5 is a flow diagram depicting an example sub-operation of the root cause analysis of FIG. 4.

Referring to FIG. 5, there is shown an example sub-operation, namely a second metadata operation 500, of the root cause analysis 400 corresponding to the repair codes 432 of FIG. 4. As stated above, the root cause analysis 400 detects 412 an airflow measurement in the airflow velocity sensor 304 of the terminal box 300 associated with the zone and determines whether the airflow measurement deviates from an airflow setpoint of the airflow velocity sensor. This process of determining deviation may be performed by detecting 502-512 a variety of fault codes and determining 514-524 corresponding actions identified by repair codes. In particular, the second metadata operation 500 may generate 514 a first airflow repair code to replace the airflow velocity sensor in response to detecting 502 that a reading of the airflow velocity sensor has failed. The second metadata operation 500 may generate 516 a second airflow repair code to release an operator override on the reading of the airflow velocity sensor in response to detecting 504 that the reading of the airflow velocity sensor has been overridden. The second metadata operation 500 may generate 518 a third airflow repair code to release an operator override on a command for a damper of the terminal box in response to detecting 506 that the command of the damper has been overridden. The second metadata operation 500 may generate 520 a fourth repair code to repair or replace the airflow velocity sensor in response to detecting 508 that the reading of the airflow velocity sensor is a null value. For example, the null value may be zero or any other suitable value. The second metadata operation 500 may generate 522 a fifth airflow repair code to release an operator override on the airflow setpoint in response to detecting 510 that the airflow setpoint has been overridden. The second metadata operation 500 may generate 524 a sixth airflow repair code to repair or replace the airflow velocity sensor in response to detecting 512 that the reading of the airflow velocity sensor is greater than a predetermined airflow setpoint threshold. For example, the reading of the airflow velocity sensor may be multiple times greater than the predetermined airflow setpoint threshold. Also, where the fourth airflow repair code is determined and applied 520, the second metadata operation 500 may generate 522 the fifth airflow repair code in response to detecting 526 that the airflow setpoint has been overridden. The root cause analysis 400, such as the second metadata operation 500, may provide, via a network connection, one or more repair codes of the set of repair codes to a remote device, and the set of repair codes may include the first through sixth airflow repair codes, among others described herein.

For some embodiments, one or more fault codes and/or repair codes do not need to be checked if other repair codes are found to be applicable for a particular situation. For example, the second metadata operation 500 does not need to detect or check 508 that the reading of the airflow velocity sensor is a null value if any one of the first airflow repair code 514, the second airflow repair code 516, or the third airflow repair code 518 is identified and generated by the operation.

Figure 6:
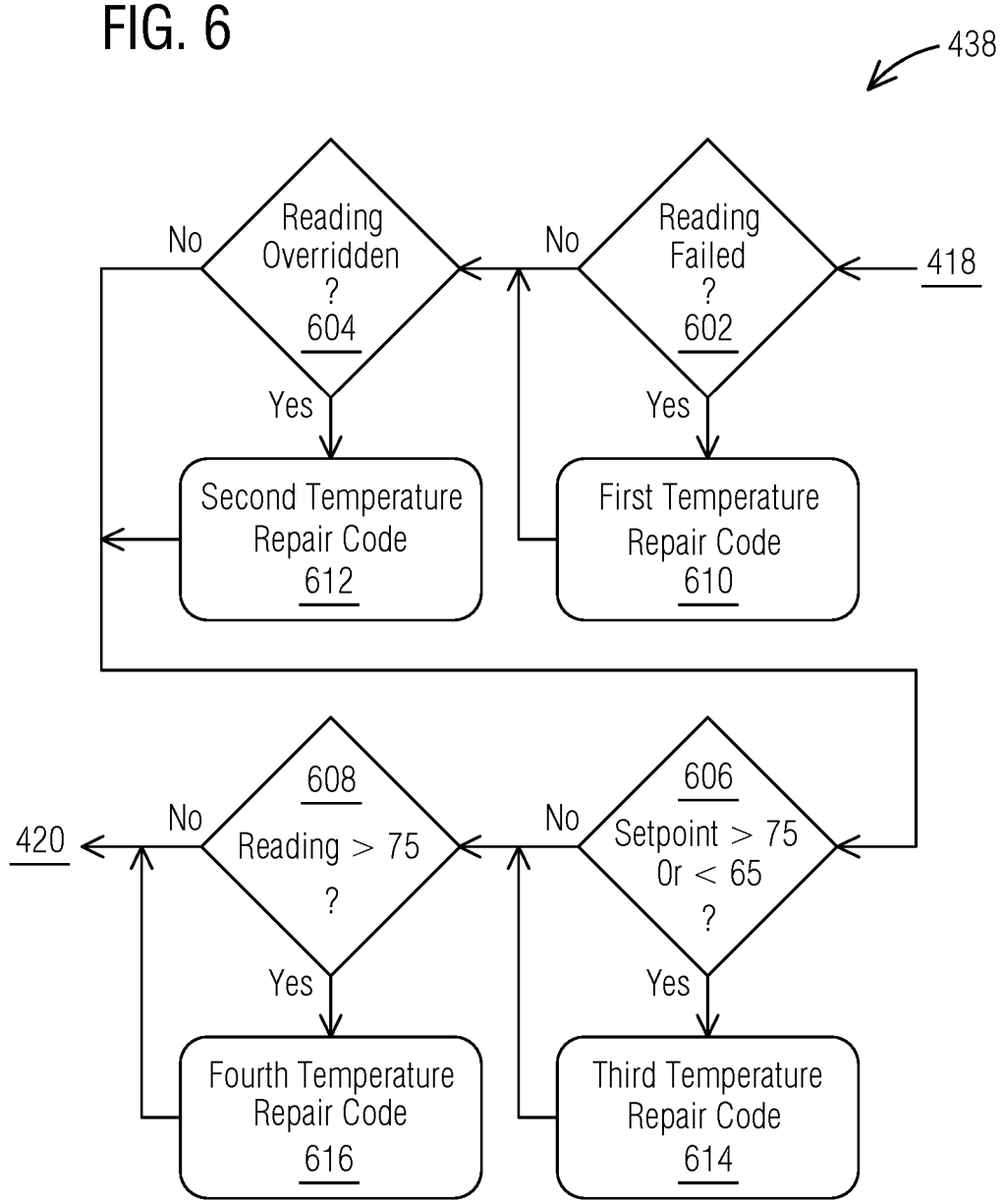
FIG. 6 is a flow diagram depicting another example sub-operation of the root cause analysis of FIG. 4.

Referring to FIG. 6, there is shown another example sub-operation, namely first metadata operation 600, of the root cause analysis 400 corresponding to the repair codes 438 of FIG. 4. As stated above, the root cause analysis 400 detects a zone temperature measurement at the zone temperature sensor 316 of the zone and determines whether the zone temperature measurement deviates from a zone temperature setpoint of the zone temperature sensor. This process of determining deviation may be performed by detecting 602-608 a variety of fault codes and determining 616-622 corresponding actions identified by repair codes. In particular, the first metadata operation 600 may generate 610 a first temperature repair code 610 to replace the zone temperature sensor in response to detecting 602 that a reading of the zone temperature sensor has failed. The first metadata operation 600 may generate 612 a second temperature repair code to release an operator override on the reading of the zone temperature sensor in response to detecting 604 that a reading of the zone temperature sensor has been overridden. The first metadata operation 600 may generate 614 a third temperature repair code to release an operator override on the zone temperature setpoint of the zone temperature sensor in response to detecting 606 that the zone temperature setpoint of the zone temperature sensor is outside a predetermined setpoint range. For example, with regard to the predetermined setpoint range, the setpoint may be greater than an upper setpoint value or less than a lower setpoint value. The first metadata operation 600 may generate 616 a fourth temperature repair code to indicate a need for a field investigation in response to detecting 608 that the reading of the zone temperature sensor is greater than a predetermined temperature reading threshold. The root cause analysis 400, such as the first metadata operation 600, may provide, via a network connection, one or more repair codes of the set of repair codes to a remote device, and the set of repair codes may include the first through fourth temperature repair codes, among others described herein.

For some embodiments, one or more fault codes and/or repair codes do not need to be checked if other repair codes are found to be applicable for a particular situation. For example, the first metadata operation 600 does not need to check that the zone temperature setpoint of the zone temperature sensor is outside a predetermined setpoint range if either one of the first temperature repair code or the second temperature repair code is identified and generated by the operation. Likewise, the first metadata operation 600 does not need to check that the reading of the zone temperature sensor is greater than a predetermined temperature reading threshold if either one of the first temperature repair code or the second temperature repair code is identified and generated by the operation.

Referring to FIGS. 4, 5, and 6, certain faults and corresponding repairs/replacements may be added to or removed from the sequence of operations, but the order of operations are to be followed as described herein to ensure that the root cause is properly identified, with the exception of a few conditions. For example, it should be noted that analysis of a first antecedent fault code and a fourth antecedent fault code provide additional value but are not required for proper function of the diagnostic process. Also, the first, second, and third airflow repair codes may be evaluated in any order relative to each other, the fifth and sixth airflow repair codes may be evaluated in any order relative to each other, and the first and second temperature repair codes may be evaluated in any order relative to each other.

FIG. 7 is presented an example commissioning or service report representing repair and/or replacement actions resulting from the analysis. This report may be the combined result from multiple, or all, zone controllers within a specific building management system, such as the embodiment depicted in FIG. 7, but for other embodiments the report may be the result of a single zone controller. The report as generated by a zone controller 120-132 or other device as a result of an root cause analysis 400 by the zone controller may include various information such as a description 702 of any determined or proposed actions as well as resources 704, 706, 708 that may be utilized for each action. The resources may include, but are not limited to, a quantity of actions 704, a quantity of parts proposed for repairs or replacements 706, and a quantity of labor proposed for the repairs or replacements 708. The report may include one or more line items 710-726 since each root cause failure identified by the zone controller, and method thereof, may require a single action or multiple actions to address the failure.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A zone controller for identifying a root cause failure at a zone comprising:
 a zone temperature sensor of the zone;
 an airflow velocity sensor of a terminal box associated with the zone;
 an input component coupled to the zone temperature sensor and the airflow velocity sensor, the input component being configured to:
  detect an antecedent condition of a terminal box;
  subsequent to detecting the antecedent condition of the terminal box, detect an airflow measurement at the airflow velocity sensor; and
  subsequent to detecting the airflow measurement at the airflow velocity sensor, detect a zone temperature measurement at the zone temperature sensor;
 a processor component coupled to the input component, the processor being configured to determine one or more antecedent actions for the terminal box in response to the input component detecting the antecedent condition, the processor being configured to generate an antecedent repair code to install a duct temperature sensor at a discharge area of the terminal box in response to detecting that the zone controller includes hot water reheat but does not include the duct temperature sensor,
 the processor being further configured to determine whether the airflow measurement deviates from an airflow velocity setpoint of the airflow sensor and perform the following operations in response to determining that the zone temperature measurement deviates from a zone temperature setpoint of the zone temperature sensor:
  generate a first temperature repair code to replace a zone temperature sensor in response to detecting that a reading of the zone temperature sensor has failed;
  generate a second temperature repair code to release an operator override on the reading of the zone temperature sensor in response to detecting that the reading of the zone temperature sensor has been overridden; and
  generate a third temperature repair code to release an operator override on a setpoint of the zone temperature sensor in response to detecting that the setpoint of the zone temperature sensor is outside a predetermined setpoint range; and
 a communication component coupled to the processor, the communication component being configured to provide, via a network connection, at least one of a plurality of repair codes to a remote device.

2. The zone controller as described in claim 1, wherein:
 the processor does not determine whether the zone temperature setpoint of the zone temperature sensor is outside the predetermined setpoint range in response to generating either of the first or second temperature repair codes.

3. The zone controller as described in claim 1, wherein, the processor generates a fourth temperature repair code to indicate a need for a field investigation in response to detecting that the reading of the zone temperature sensor is greater than a predetermined temperature reading threshold; and
 the plurality of repair codes includes the fourth temperature repair code.

4. The zone controller as described in claim 1, wherein:
 the processor determines one or more antecedent actions for the terminal box in response to the input component detecting the antecedent condition, the processor being configured to:
  generate a first antecedent repair code to replace the zone controller in response to detecting a failure at the zone controller;
  generate a second antecedent repair code to correct minimum and maximum airflow setpoints in response to detecting that the minimum and maximum airflow setpoints are set to the default values; and
  generate a third antecedent repair code to correct minimum airflow setpoints in response to detecting that the minimum airflow setpoints mismatch,
 wherein the plurality of repair codes includes the first, second, and third antecedent repair codes.

5. A method of a zone controller for identifying a root cause failure at a zone, the method comprising:
 detecting an antecedent condition of a terminal box;

determining one or more antecedent actions for the terminal box in response to detecting the antecedent condition, including generating an antecedent repair code to install a duct temperature sensor at a discharge area of the terminal box in response to detecting that the zone controller includes hot water reheat but does not include the duct temperature sensor;

subsequent to detecting the antecedent condition of the terminal box, detecting an airflow measurement at an airflow velocity sensor of the zone;

determining whether the airflow measurement deviates from an airflow velocity setpoint of the airflow sensor;

subsequent to detecting the airflow measurement at the airflow velocity sensor of the zone, detecting a zone temperature measurement at a zone temperature sensor of the zone;

determining whether the zone temperature measurement deviates from a zone temperature setpoint of the zone temperature sensor;

performing the following operations in response to determining that the zone temperature measurement deviates from a zone temperature setpoint of the zone temperature sensor:
generating a first temperature repair code to replace a zone temperature sensor in response to detecting that a reading of the zone temperature sensor has failed;
generating a second temperature repair code to release an operator override on the reading of the zone temperature sensor in response to detecting that the reading of the zone temperature sensor has been overridden; and
generating a third temperature repair code to release an operator override on the zone temperature setpoint of the zone temperature sensor in response to detecting that the zone temperature setpoint of the zone temperature sensor is outside a predetermined setpoint range; and
providing, via a network connection, at least one of a plurality of repair codes to a remote device.

6. The method as described in claim 5, wherein determining whether the zone temperature setpoint of the zone temperature sensor is outside the predetermined setpoint range is not checked in response to generating either of the first or second temperature repair codes.

7. The method as described in claim 5, further comprising generating a fourth temperature repair code to indicate a need for a field investigation in response to detecting that the reading of the zone temperature sensor is greater than a predetermined temperature reading threshold, wherein the plurality of repair codes includes the fourth temperature repair code.

8. The method as described in claim 5, further comprising:
determining one or more antecedent actions for the terminal box in response to detecting the antecedent condition, including:
generating a first antecedent repair code to replace the zone controller in response to detecting a failure at the zone controller;
generating a second antecedent repair code to correct minimum and maximum airflow setpoints in response to detecting that the minimum and maximum airflow setpoints are set to the default values; and
generating a third antecedent repair code to correct minimum airflow setpoints in response to detecting that the minimum airflow setpoints mismatch,
wherein the plurality of repair codes includes the first, second, and third antecedent repair codes.

9. The zone controller as described in claim 1, wherein:
the processor is configured to perform the following operations in response to determining that the airflow measurement detected by the input component deviates from the airflow setpoint of the airflow velocity sensor:
generate a first airflow repair code to replace the airflow velocity sensor in response to detecting that a reading of the airflow velocity sensor has failed;
generate a second airflow repair code to release an operator override on the reading of the airflow velocity sensor in response to detecting that the reading of the airflow velocity sensor has been overridden; and
generate a third airflow repair code to release an operator override on a command for a damper of the terminal box in response to detecting that the command of the damper has been overridden;
generate a fourth airflow repair code to repair or replace the airflow velocity sensor in response to detecting that the reading of the airflow velocity sensor is a null value;
generate a fifth airflow repair code to release an operator override on the airflow setpoint in response to detecting that the airflow setpoint has been overridden; and
generate a sixth airflow code to repair or replace the airflow velocity sensor in response to detecting that the reading of the airflow velocity sensor is greater than a predetermined airflow setpoint threshold, and
a communication component coupled to the processor, the communication component being configured to provide, via a network connection, at least one of a plurality of repair codes to a remote device.

10. The zone controller as described in claim 9, wherein the processor does not detect whether the reading of the airflow velocity sensor is the null value in response to generating the first, second, or third airflow repair codes.

11. The zone controller as described in claim 9, wherein the processor determines that a damper actuator is unresponsive or leaking in response to the input component detecting the airflow measurement at the air velocity sensor with damper commanded closed.

12. The zone controller as described in claim 9, wherein the processor determines that a hydronic control valve is unresponsive or leaking in response to the input component detecting a heating or cooling device fault detected at a reheat subsystem of the terminal box.

13. The method as described in claim 5, further comprising:
performing the following operations in response to determining that the airflow measurement deviates from the airflow setpoint of the airflow velocity sensor:
generating a first airflow repair code to replace the airflow velocity sensor in response to detecting that a reading of the airflow velocity sensor has failed;
generating a second airflow repair code to release an operator override on the reading of the airflow velocity sensor in response to detecting that the reading of the airflow velocity sensor has been overridden; and
generating a third airflow repair code to release an operator override on a command for a damper of the terminal box in response to detecting that the command of the damper has been overridden;

generating a fourth airflow repair code to repair or replace the airflow velocity sensor in response to detecting that the reading of the airflow velocity sensor is a null value;

generating a fifth airflow repair code to release an operator override on the airflow setpoint in response to detecting that the airflow setpoint has been overridden; and generating a sixth airflow repair code to repair or replace the airflow velocity sensor in response to detecting that the reading of the airflow velocity sensor is greater than a predetermined airflow setpoint threshold; and providing, via a network connection, at least one of a plurality of repair codes to a remote device.

14. The method as described in claim 13, wherein detecting that the reading of the airflow velocity sensor is the null value is not checked in response to generating either of the fifth, sixth, or seventh airflow repair codes.

15. The method as described in claim 13, further comprising determining that a damper actuator is unresponsive or leaking in response to detecting the airflow measurement at the airflow velocity sensor with damper commanded closed.

16. The method as described in claim 13, further comprising determining that a hydronic control valve is unresponsive or leaking in response to detecting a heating or cooling device fault detected at a reheat subsystem of the terminal box associated with the zone.

17. A zone controller for identifying a root cause failure at a zone comprising:
- a zone temperature sensor of the zone;
- an airflow velocity sensor of a terminal box associated with the zone;
- an input component coupled to the zone temperature sensor and the airflow velocity sensor, the input component being configured to:
  - detect an antecedent condition of a terminal box;
  - subsequent to detecting the antecedent condition of the terminal box, detect an airflow measurement at the airflow velocity sensor; and
  - subsequent to detecting the airflow measurement at the airflow velocity sensor, detect a zone temperature measurement at the zone temperature sensor; and
- a processor component coupled to the input component, the processor being configured to determine one or more antecedent actions for the terminal box in response to the input component detecting the antecedent condition, the processor being configured to generate an antecedent repair code to install a duct temperature sensor at a discharge area of the terminal box in response to detecting that the zone controller includes hot water reheat but does not include the duct temperature sensor,
- the processor being further configured to determine at least one of whether the airflow measurement deviates from an airflow velocity setpoint of the airflow sensor or determine whether the zone temperature measurement deviates from a zone temperature setpoint of the zone temperature sensor.

18. A method of a zone controller for identifying a root cause failure at a zone, the method comprising:
- detecting an antecedent condition of a terminal box;
- determining one or more antecedent actions for the terminal box in response to detecting the antecedent condition, including generating an antecedent repair code to install a duct temperature sensor at a discharge area of the terminal box in response to detecting that the zone controller includes hot water reheat but does not include the duct temperature sensor;
- subsequent to detecting the antecedent condition of the terminal box, detecting an airflow measurement at an airflow velocity sensor of the zone;
- determining whether the airflow measurement deviates from an airflow velocity setpoint of the airflow sensor;
- subsequent to detecting the airflow measurement at the airflow velocity sensor of the zone, detecting a zone temperature measurement at a zone temperature sensor of the zone; and
- determining whether the zone temperature measurement deviates from a zone temperature setpoint of the zone temperature sensor.

* * * * *